(12) United States Patent
Ore et al.

(10) Patent No.: US 9,086,120 B2
(45) Date of Patent: Jul. 21, 2015

(54) COMPACT CREEPER GEAR ARRANGEMENT FOR A TRANSMISSION

(75) Inventors: Thomas George Ore, Cedar Falls, IA (US); Aaron David Wikner, Waterloo, IA (US)

(73) Assignee: Deere & Company, Moline, IL (US)

( * ) Notice: Subject to any disclaimer, the term of this patent is extended or adjusted under 35 U.S.C. 154(b) by 93 days.

(21) Appl. No.: 13/000,654

(22) PCT Filed: Jul. 3, 2008

(86) PCT No.: PCT/US2008/008278
§ 371 (c)(1),
(2), (4) Date: Dec. 22, 2010

(87) PCT Pub. No.: WO2010/002371
PCT Pub. Date: Jan. 7, 2010

(65) Prior Publication Data
US 2011/0100159 A1    May 5, 2011

(51) Int. Cl.
*F16H 37/06* (2006.01)
*F16H 3/093* (2006.01)

(52) U.S. Cl.
CPC ........ *F16H 3/093* (2013.01); *F16H 2200/0026* (2013.01); *Y10T 74/19051* (2015.01)

(58) Field of Classification Search
CPC .......................... F16H 3/093; F16H 2200/0026
USPC ......................................................... 74/665 F
See application file for complete search history.

(56) References Cited

U.S. PATENT DOCUMENTS

| 2,526,919 | A | * | 10/1950 | Wilson .............................. 74/333 |
| 3,542,176 | A | * | 11/1970 | Foxwell et al. .............. 192/3.51 |
| 3,885,446 | A | * | 5/1975 | Pengilly .......................... 74/331 |
| 4,208,923 | A | * | 6/1980 | Ikegami ....................... 74/15.63 |
| 4,565,102 | A | * | 1/1986 | Miyahara et al. .............. 74/15.4 |
| 4,658,662 | A | * | 4/1987 | Rundle ............................ 74/331 |
| 4,763,748 | A | * | 8/1988 | Miura et al. ................... 180/248 |
| 4,805,471 | A | * | 2/1989 | Loeffler .......................... 74/333 |
| 4,807,458 | A | * | 2/1989 | Buch et al. ....................... 72/235 |
| 4,807,493 | A | * | 2/1989 | Loeffler .......................... 74/745 |
| 4,833,933 | A | * | 5/1989 | Lomas et al. ................... 74/359 |
| 5,248,283 | A | * | 9/1993 | Eckhardt et al. ................ 475/72 |
| 5,390,559 | A | * | 2/1995 | Thomas et al. ................. 74/325 |
| 5,458,014 | A | * | 10/1995 | Thomas et al. ................. 74/325 |
| 5,465,630 | A |   | 11/1995 | Iwamoto |

(Continued)

FOREIGN PATENT DOCUMENTS

GB        1518490        7/1978

OTHER PUBLICATIONS

European Search Report, Feb. 1, 2012, 9 pages.

*Primary Examiner* — William Kelleher
*Assistant Examiner* — Zakaria Elahmadi
(74) *Attorney, Agent, or Firm* — Quarles & Brady LLP

(57) ABSTRACT

A compact creeper gear arrangement (70) for a multiple speed transmission (12) in which the creeper gear input (78) and output shafts (88) are laterally spaced from and parallel to the major shafts within the transmission. The creeper gear arrangement (70) utilizes an input gear (74) integral with one of the speed range gears (72) and selectively coupled to a shaft (24) that provides an input to a mechanical front wheel drive assembly (41). The creeper gear arrangement (70) is a dual speed selectively engageable transmission where much of the mechanism is located within otherwise unused space within the transmission.

20 Claims, 5 Drawing Sheets

(56) References Cited

U.S. PATENT DOCUMENTS

| | | | |
|---|---|---|---|
| 5,526,709 A * | 6/1996 | Thomas et al. | 74/325 |
| 5,546,823 A * | 8/1996 | Stine et al. | 74/331 |
| 5,642,643 A * | 7/1997 | Reynolds et al. | 74/331 |
| 5,907,974 A * | 6/1999 | Stine | 74/473.21 |
| 5,910,066 A * | 6/1999 | Schulz et al. | 475/336 |
| 6,119,552 A * | 9/2000 | Matsufuji | 74/606 R |
| RE39,669 E * | 6/2007 | Kanazawa | 74/665 F |
| 8,157,072 B2 * | 4/2012 | Bowen | 192/70.23 |
| 2003/0226416 A1 | 12/2003 | Umemoto et al. | |
| 2007/0266812 A1 | 11/2007 | Asada | |
| 2007/0277635 A1* | 12/2007 | Komori | 74/340 |
| 2009/0293669 A1* | 12/2009 | Lim | 74/665 F |
| 2010/0107811 A1* | 5/2010 | McCloy | 74/665 F |
| 2010/0180722 A1* | 7/2010 | Sasaki | 74/665 F |

* cited by examiner

COMPACT CREEPER GEAR ARRANGEMENT FOR A TRANSMISSION

FIELD OF THE INVENTION

The present invention relates to work machines and more particularly to transmissions used in such work machines.

BACKGROUND OF THE INVENTION

A work machine such as an agricultural tractor may be driven with motive force taking several forms such as a rear wheel drive, four wheel drive (4WD), mechanical front wheel drive (MFWD), endless track drive and others. In the case of an MFWD equipped tractor, the front wheel drive is typically not full time and an electronic switch in the operator station is used to switch between rear wheel drive and MFWD mode.

A work machine incorporating such a transmission is powered by a prime mover, usually consisting of a compression ignition or diesel engine. Such engine operates over a range of engine rpm's but has certain operating conditions in which the torque output and fuel efficiency are at a high level. The purpose of the transmission in such a work machine is to match ground speed to the optimal engine operating conditions so as to provide fuel efficient and effective operation.

Such work machines have a condition where the vehicle is required to move forward along the ground at a velocity substantially lower than the normal operational velocity of the vehicle. To accomplish this purpose, creeper gear arrangements may be provided in transmissions for work vehicles. These creeper gear arrangements may be a single speed or multiple speed arrangement. In prior art transmissions the creeper gear has been incorporated before or after the speed ratio gears or may function as a separate range. Typically, these designs add between approximately 50 millimeters and 75 millimeters of overall length to the transmission. With such a significant increase in length, the vehicle envelope is affected in a way that works against a compact work vehicle arrangement.

What is needed therefore in the art is a compact creeper gear arrangement for a transmission in a work vehicle.

SUMMARY OF THE INVENTION

In one form, the invention includes a creeper gear arrangement for a vehicle transmission having a driven range gear and a main output drive shaft co-axial with the range gear, the range gear being selectively coupled and decoupled to the main output drive shaft. The creeper gear arrangement includes a creeper input gear affixed to and co-axial with the range gear and a creeper driven gear meshing with the creeper input gear and affixed to a creeper gear input shaft parallel to and spaced from the main output drive shaft. A pair of intermeshing gears is respectively affixed to the main output drive shaft and a secondary output shaft co-axial with the creeper gear input shaft. A device selectively interconnects the creeper gear input shaft with the secondary output shaft when the range gear is decoupled with the main output drive shaft.

In another form, the invention is a vehicle transmission including: a main input drive shaft; a main output drive shaft; a range gear positioned over and co-axial with the main output drive shaft, the range gear being driven from the main input drive shaft and selectively coupled and decoupled to the main output drive shaft. A creeper input gear is affixed to and co-axial with the range gear. A creeper driven gear meshes with the creeper input gear and is affixed to a creeper gear input shaft parallel to and spaced from said main output drive shaft. A pair of intermeshing gears is respectively affixed to the main output drive shaft and a secondary output shaft co-axial with the creeper gear input shaft. A device selectively interconnects the idler shaft with the secondary output shaft when the range gear is decoupled with the main output drive shaft.

In yet another form, the invention is a work machine having an engine, a mechanical front wheel drive, and a vehicle transmission including a main input drive shaft, a main output drive shaft and a range gear positioned over and co-axial with the main output drive shaft, the range gear being driven from the main input drive shaft and selectively coupled and decoupled to the main output drive shaft. A creeper input gear is affixed to and co-axial with the range gear. A creeper driven gear meshes with the creeper input gear and is affixed to a creeper gear input shaft parallel to and spaced from the main output drive shaft. The creeper driven gear is affixed to and co-axial with the creeper gear input shaft. A pair of intermeshing gears are respectively affixed to the main output drive shaft and a secondary output shaft co-axial with the idler shaft A device selectively interconnects the creeper gear input shaft with the secondary output shaft when the range gear is decoupled with the main output drive shaft. The secondary output shaft provides a drive input to the mechanical front wheel drive.

DETAILED DESCRIPTION OF THE INVENTION

Figure 1:
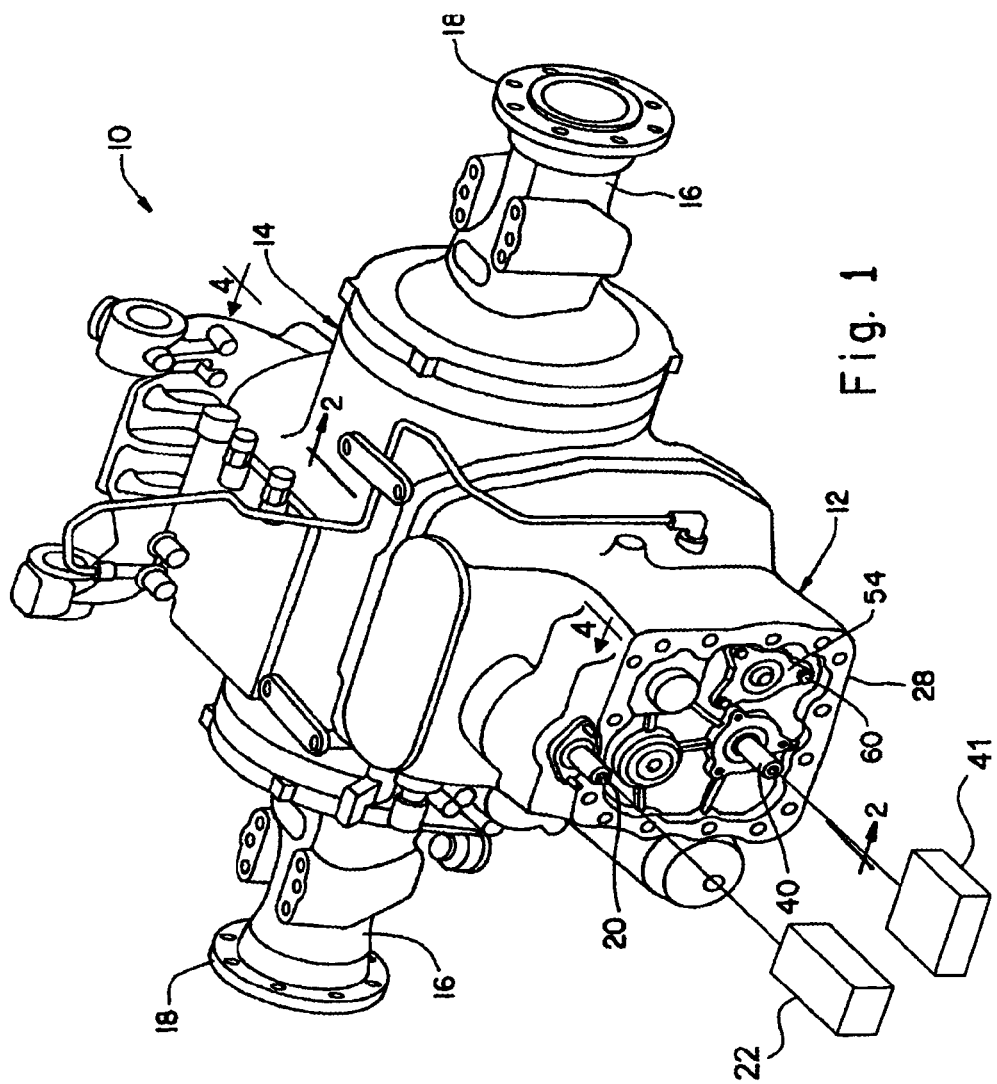
FIG. 1 shows a perspective view of a work machine and transmission incorporating a creeper gear according to the present invention.
Figure 2:
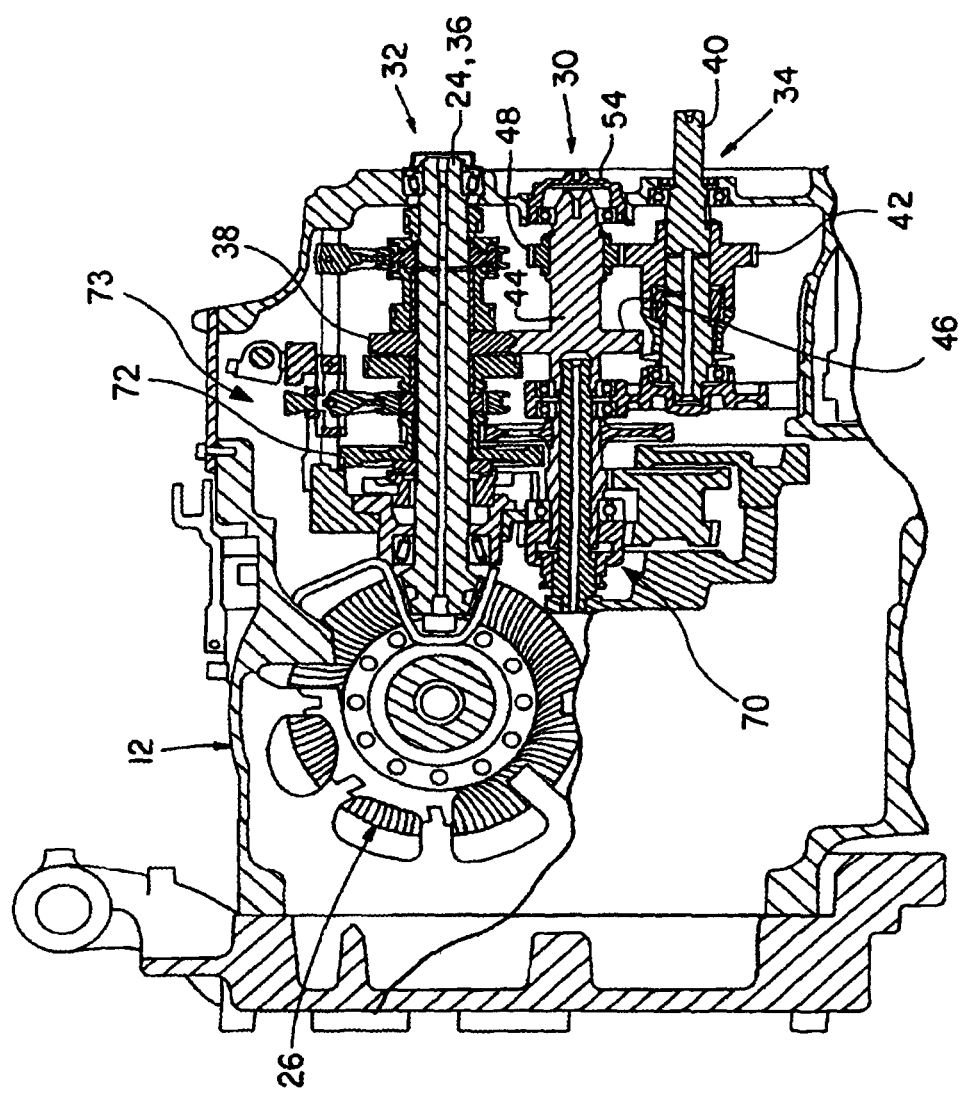
FIG. 2 is a side, sectional view through the transmission shown in FIG. 1, taken along line 2-2.

Referring now to the drawings, and more particularly to FIGS. 1 and 2, there is shown a portion of a work machine 10 in the form of an agricultural tractor, particularly the rear end drive train of the tractor. Although shown as an agricultural tractor, it is possible that work machine 10 could be in the form of a different type of work machine, such as a construction tractor or forestry machine.

Tractor 10 includes a transmission 12 which is coupled with a rear end differential 14, which in turn drives a pair of rear axles 16. Each rear axle 16 includes an outboard hub 18 to which a respective rear drive wheel (not shown) is mounted.

Transmission 12 includes a main input drive shaft, such as a driven shaft 20, which is mechanically coupled with and receives rotational input power from IC engine 22, shown schematically in FIG. 1. Driven shaft 20 transfers rotational power via appropriate gearing to, a main output drive shaft, such as a differential drive shaft 24, which in turn extends from the rear of and provides rotational input power to rear end differential gear set 26 (see FIG. 2).

Figure 3:
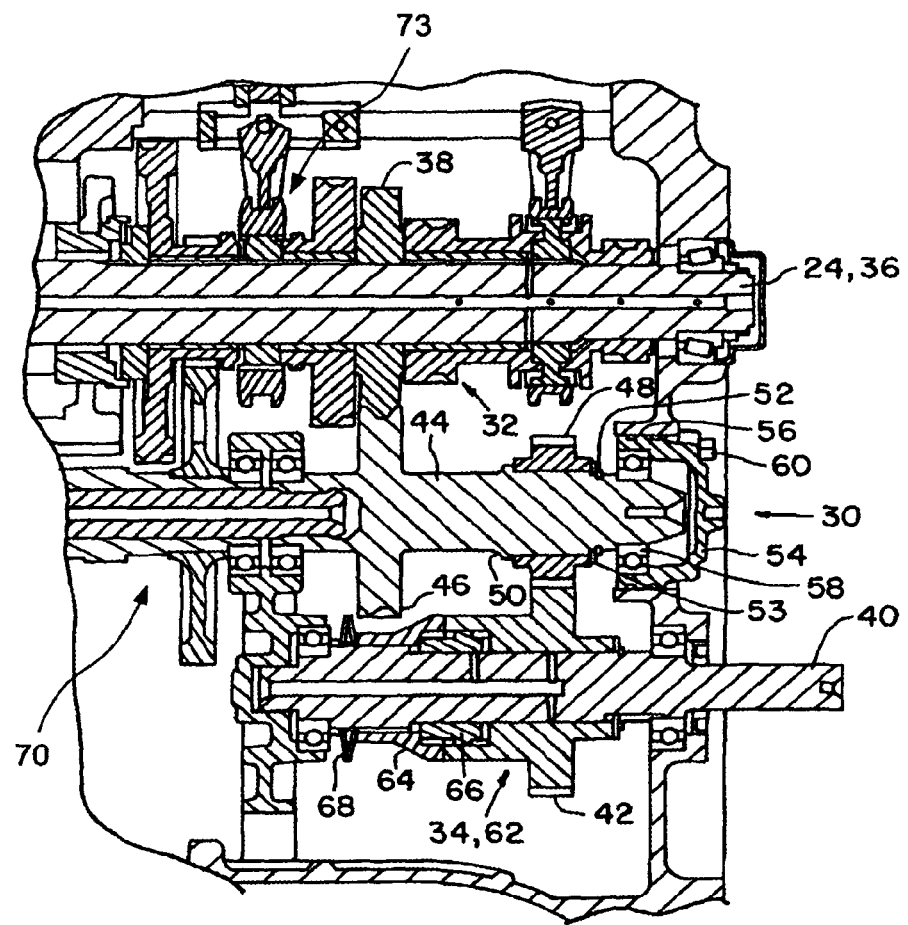
FIG. 3 is an enlarged view of detail A shown in FIG. 2.

Driven shaft 20 extends through and is rotatably carried by housing 28, which likewise houses and rotatably carries a number of other components. Also positioned within and carried by housing 28 is an idler arrangement 30 which mechanically interconnects between a power input 32 and a power output 34. Referring to FIGS. 2 and 3, power input 32 includes an input shaft 36 and an input gear 38 carried by input shaft 36. In the embodiment shown, input shaft 36 is in fact the differential drive shaft 24, but could be a different rotatable drive shaft providing input power to idler arrangement 30. Input shaft 36 receives input power from driven shaft 20 coupled with IC engine 22.

The terms power input 32 and power output 34 are used relative to idler arrangement 30. That is, power input 32 provides input power to idler arrangement 30, and power output 34 receives and provides power output from idler arrangement 30.

Idler arrangement 30 (FIGS. 3 and 4) includes an idler shaft 44, driven gear 46 and drive gear 48. Driven gear 46 is rigidly fixed to idler shaft 44 and rotates therewith during operation. Drive gear 48 has an inside diameter which is splined to the outside diameter of idler shaft 44 when in an installed position. Drive gear 48 abuts against a shoulder 50 on idler shaft 44 (see FIG. 3.) for retention in one axial direction, and is retained by a snap ring 52 in the other axial direction (with a thrust washer 53 between snap ring 52 and drive gear 48).

An access cover 54 forms part of housing 28, and fits within an access opening 56 formed in housing 28. Access cover 54 also defines a bearing support which supports a bearing 62, which in turn has an inner race which rotatably carries an outboard end of idler shaft 44. Access cover 54 is fastened to housing 28 using three bolts 60, or other suitable fastening technique.

Power output 34 similarly includes an output shaft 40 and an output gear 42 carried by output shaft 40. In the embodiment shown, output shaft 40 extends through housing 28 and provides rotational output power to the MFWD, shown schematically in FIG. 1 by reference character 41 at the front axle of tractor 10. Output gear 42 is clutched to output shaft 40 so that output gear 42 positively rotates with output shaft 40 when the MFWD is engaged by actuation of a switch (not shown) in the operator's station.

More particularly, a clutch arrangement 62 generally includes output gear 42, shift collar 64, annular piston 66 and spring 68 (FIG. 3). Output gear 42 is selectively coupled to output shaft by the clutch arrangement 62 to provide a power output to the MFWD.

As stated above, the transmission 12 for the work machine 10 has normal speed range gears, a portion of which are shown on input shaft 24 in FIGS. 2 and 3. The gears are placed on shaft 24 and intermesh with gears on the input shaft 36 in such a fashion that multiple speed ranges from the work machine 10 may be achieved while maintaining, the engine 22 at an optimum duty cycle condition. For such a transmission it may also have a creeper gear arrangement, illustrated by reference character 70 in FIGS. 2, 3 and 4. Creeper gear arrangement 70 has, an input from a speed range gear 72 telescoped over shaft 24. Speed range gear 72 may be one of the speed range gears but, as herein shown, is the A range gear which is rotating whenever the transmission is engaged. Gear 72 is coupled or decoupled to shaft 24 by a clutch arrangement 73 shown in FIGS. 2 and 3.

Figure 4:
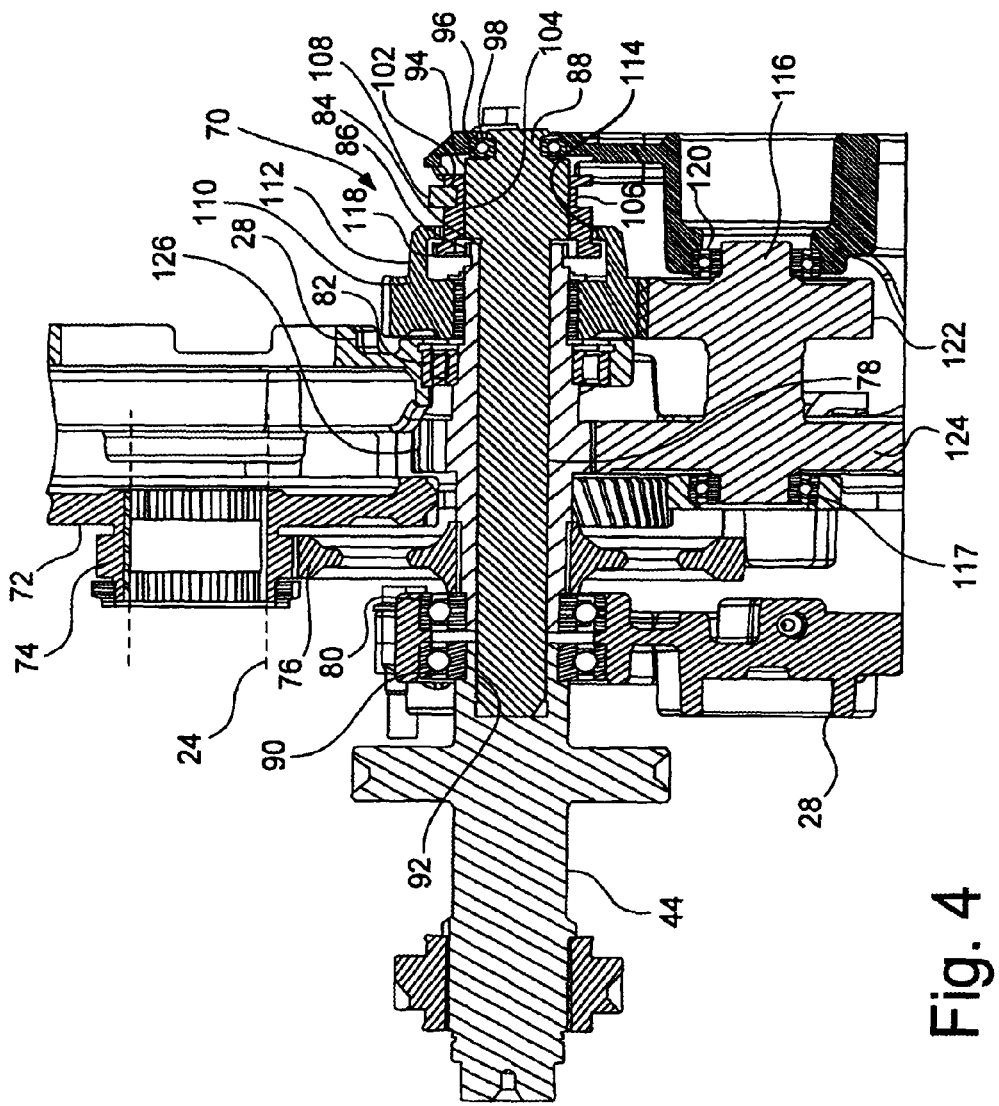
FIG. 4 is an enlarged detailed view of a portion of FIG. 1 taken on lines 4-4 of FIG. 1.

As shown particularly in FIG. 4, speed range gear 72 has integral therewith a creeper input gear 74 coaxial with and affixed to speed range gear 72. Creeper input gear 74 meshes with a corresponding gear 76 affixed to gear 76 is affixed to and rotates with a tubular creeper gear input shaft 78 parallel to and spaced from the axis of shaft 24. As shown herein, creeper gear input shaft 78 is journaled on one end by a bearing assembly 80 mounted in housing 28 and at the other end by a bearing assembly 82, also mounted in housing 28. Creeper gear input shaft 78 extends to an end 84 having an outwardly splined section 86. A creeper gear output shaft 88 is coaxial with and telescoped into tubular idler shaft creeper gear input shaft 78 and is supported at the left end as shown in FIG. 4 by shaft 44 which is journaled in housing 28 by means of a bearing assembly 90. The left end of creeper gear output shaft 88 is suitably splined to shaft 44 at 92 so that the shafts are coaxial with, and rotate together.

The right end of shaft 88 has an outwardly facing splined section 94 terminating in a shoulder 96 for a bearing assembly 98 that is mounted in frame 100 suitably affixed to housing 28. An axially displaceable sleeve 102 is received over the splines 94 and has inwardly directed splines 104 so that sleeve 102 rotates with shaft 88 but is axially displaceable along shaft 88. Sleeve 102 has a groove 106 receiving a fork 108 for an appropriate mechanism to move sleeve 102 between a plurality of positions. In the position illustrated in FIG. 4, the sleeve 102 is in a neutral position where the outwardly facing spline 86 of creeper gear' input shaft 78 does not engage the inwardly facing splines 104 of sleeve 102 and, as such, the creeper gear is not operable. If fork 108 is manipulated to move sleeve 102 to the left as shown in FIG. 4, splines 86 inter-engage with splines 104 to provide a direct connection between creeper gear input shaft 78 and creeper gear output shaft 88.

The creeper gear arrangement 70 may be a single speed in which sleeve 102 engages or disengages the connection between creeper gear input shaft 78 and output shaft 88. However, as illustrated herein, creeper gear arrangement 70 has a second speed in which a different speed ratio is utilized. For this purpose, a gear 110 is telescoped over and journaled with respect to creeper gear input shaft 78. Gear 110 has an annular extension 112 terminating in inwardly facing splines 114 sized to inter-engage with outwardly facing splines 118 on sleeve 102. Gear 110 meshes with a gear set 116 journaled by means of bearing assemblies 117 and 120. Gear set 116 has a first gear 122 meshing with gear 110 and a second gear 124 meshing with a gear 126 integral with creeper gear input shaft 78.

Accordingly, movement of the sleeve 102 to the right from the position shown in FIG. 4 engages splines 118 and 114 to provide a connection between gear 110 and output shaft 88 to provide a low speed creeper gear. Gear 110 meshes with the gear set 116 having gear 124 meshing with gear 126 on the creeper gear input shaft 78. In this position, the power flow is from the creeper gear input shaft 78 through gear 126 meshing with gear 124. Gear 122 meshes with gear 110 which connects to creeper gear output shaft 88 through splines 118 and 114. This provides a second speed for the creeper gear output.

The creeper gear output shaft is connected to shaft 44 which in turn is connected to shaft 24 through the gear set 38 and 46. As indicated previously, the output of shaft 24 is to the differential arrangement for transmission 12 but, in addition, is an input to the gear set providing power to the MFWD assembly 41.

For the neutral position illustrated in FIG. 4, rotation of the A range gear 72 and integral creeper input gear 74 cause the creeper gear input shaft 78 to rotate. However, because the sleeve 102 is neither engaged directly with creeper input shaft 78 and creeper gear output shaft 88 and does not engage the splines 118 and 114 to the gear 110, no movement is translated to the creeper gear output shaft 88. The connection between shaft 44 and the MFWD is controlled in the normal fashion to either engage or disengage the MFWD drive at the front of the vehicle.

Figure 5:
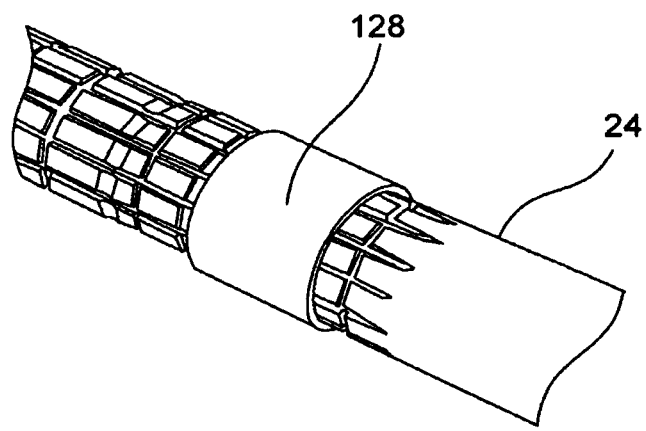
FIG. 5 is a perspective view of a bearing assembly used in the arrangements shown in FIG. 1.

Activation of the creeper gear arrangement 70 is first initiated by moving the clutch assembly 73 so that gear 72 is de-coupled from shaft 24. The sleeve 102 is then moved axially to the left from the position shown in FIG. 4 to a high speed creeper gear ratio so that sleeve 102 directly couples the creeper gear input shaft 78 and the creeper gear output shaft 88. This rotation is transferred to the differential drive shaft 24 through the gear set 38 and 46 to provide a creeper gear arrangement. It should be noted that in this position the A range gear 72, and thus the creeper input gear 74, are turning relative to differential drive shaft 24. In order to more appropriately accommodate the radial loads on these gears, a sleeve bearing 128 is telescoped over differential input shaft 24 as shown in FIG. 5. Thus, the power flow is from a gear engaging A range gear 72 through the creeper input gear 76, creeper gear input shaft 78 and directly to the creeper gear output shaft 88 to the shaft 44, which, in turn, drives the differential input shaft 24 through the intermeshing of gears 46 and 38. The clutch mechanism 62 is selectively used to engage or disengage the MFWD 41, either when the transmission 12 is in the creeper mode or not.

If the second speed for the creeper gear arrangement 70 is desired to be utilized, the sleeve 102 is displaced to the right from the position shown in FIG. 4 so that the splines 118 and 114 are engaged. In this position, the power flow is from the A range gear 72 through the creeper input gear 74 through gear 76 to creeper gear input shaft 78. From there it is transferred through meshing gears 126 and 124 and through gear 122 to gear 110 which is then coupled to the creeper gear output shaft 88. Thus it is seen that a second creeper gear input speed is available.

The benefits of such an arrangement are that the creeper gear input and output shafts are spaced from but parallel to the main power shafts in the transmission. This enables any additional space to be lateral rather than axial to provide an extremely compact transmission. Since the transmission incorporates an MFWD, the input shafts for such a drive are utilized to accommodate the input and output creeper gear shafts. In addition, the sleeve 102 and associated interconnections are placed in the otherwise empty space in the transmission 12 underneath the differential assembly 26. This is shown particularly in FIG. 2. This arrangement enables a highly compact transmission with minimum axial length but with the full features shown in substantially larger transmissions.

Having described the preferred embodiment, it will become apparent that various modifications can be made without departing from the scope of the invention as defined in the accompanying claims.

The invention claimed is:

1. A creeper gear arrangement for a vehicle transmission having a range gear and a main output drive shaft co-axial with said range gear, said range gear being selectively coupled and decoupled to said main output drive shaft by a clutch arrangement, said creeper gear arrangement comprising:
   a creeper input gear affixed to and co-axial with said range gear;
   a creeper driven gear meshing with said creeper input gear and affixed to a creeper gear input shaft parallel to and spaced from said main output drive shaft;
   said creeper gear input shaft having a first lateral end and a second lateral end;
   a pair of intermeshing gears respectively affixed to said main output drive shaft and a secondary output shaft co-axial with said creeper gear input shaft; and
   a device to selectively interconnect said creeper gear input shaft with said secondary output shaft when said range gear is de-coupled with said main output drive shaft, wherein said creeper gear arrangement has a multiple speed function and wherein said creeper gear input shaft is disposed radially outward of the secondary output shaft between the first and second lateral ends and wherein both said first lateral end and second lateral end of the creeper gear input shaft are telescoped over said secondary output shaft and said selectively interconnecting device is positioned at the end of said secondary output shaft and said creeper gear input shaft;
   wherein said selectively interconnecting device includes a sleeve in a neutral position in which said selectively interconnecting device fails to couple said secondary output shaft to said creeper gear input shaft, said sleeve being axially movable to a first active position in which said selectively interconnecting device directly couples said secondary output shaft to said creeper gear input shaft, and said sleeve being axially movable to a second active position axially displaced from said first active position in which said selectively interconnecting device couples said secondary output shaft to said creeper gear input shaft via a gearing arrangement.

2. The creeper gear arrangement as claimed in claim 1, wherein said secondary output shaft is coupled to a drive for a mechanical front wheel drive.

3. The creeper gear arrangement as claimed in claim 1, wherein said main output shaft comprises a drive to a differential unit in said transmission.

4. The creeper gear arrangement as claimed in claim 1, wherein said multiple speed function for said creeper gear is one of high, neutral and low speed.

5. The creeper gear arrangement as claimed in claim 1, further includes a gear reduction with a first gear on said creeper gear input shaft and a second gear telescoped over and journaled on said creeper gear input shaft and a pair of gears with a given ratio meshing with said first gear and said second gear.

6. The creeper gear arrangement as claimed in claim 5, wherein said second gear has inward facing splines and said collar has said outward facing splines to provide interengagement.

7. The creeper gear arrangement as claimed in claim 1, further comprising a bushing on said main output shaft journaling said creeper input gear and said range gear.

8. The creeper gear arrangement as claimed in claim 1, wherein said range gear is the lowest speed of a plurality of range gears.

9. A vehicle transmission comprising:
   a main input drive shaft;
   a main output drive shaft;
   a range gear positioned over and co-axial with said main output drive shaft, said range gear being driven from said main input drive shaft and selectively coupled and decoupled to said main output drive shaft by a clutch arrangement;
   a creeper input gear affixed to and co-axial with said range gear;
   a creeper driven gear meshing with said creeper input gear and affixed to a creeper gear input shaft parallel to and spaced from said main output drive shaft, said creeper driven gear being affixed to and co-axial with said creeper gear input shaft;
   said creeper gear input shaft having a first lateral end and a second lateral end;
   a pair of intermeshing gears respectively affixed to said main output drive shaft and a secondary output shaft co-axial with an idler shaft; and
   a device to selectively interconnect said creeper gear input shaft with said secondary output shaft when said range gear is de-coupled with said main output drive shaft, wherein said creeper gear arrangement has a multiple speed function and wherein said creeper gear input shaft is disposed radially outward of the secondary output shaft between the first and second lateral ends and wherein both said first lateral end and second lateral end of the creeper gear input shaft are telescoped over said secondary output shaft and said selectively interconnecting device is positioned at the end of said secondary output shaft and said creeper gear input shaft;

wherein said selectively interconnecting device includes a sleeve positionable in a neutral position in which said selectively interconnecting device fails to couple said secondary output shaft to said creeper gear input shaft, said sleeve being axially movable to a first active position in which said selectively interconnecting device directly couples said secondary output shaft to said creeper gear input shaft, and said sleeve being axially movable to a second active position axially displaced from said first active position in which said selectively interconnecting device couples said secondary output shaft to said creeper gear input shaft via a gearing arrangement.

10. The vehicle transmission as claimed in claim 9, further comprising a mechanical front wheel drive and said secondary output shaft provides an input to said mechanical front wheel drive.

11. The vehicle transmission as claimed in claim 9, wherein said transmission further comprises an integrated differential and said main output shaft provides an input to said differential.

12. The vehicle transmission as claimed in claim 9, wherein said multiple speed arrangement for said creeper gear comprises one of a high, neutral and low speed.

13. The vehicle transmission as claimed in claim 9, having a first gear affixed to and coaxial with said creeper gear input shaft and a second gear telescoped over said creeper gear input shaft and journaled thereto and a gear set meshing with said first gear and said second gear, said gear set having a fixed ratio therebetween.

14. The vehicle transmission as claimed in claim 13, wherein said telescoping second gear has inwardly facing splines and said collar has outwardly facing splines to affect engagement therebetween.

15. The creeper gear arrangement as claimed in claim 1, wherein said selectively interconnecting device further includes a fork, and wherein said sleeve has a groove sized to accept said fork and move axially by engagement of said fork in said groove.

16. The vehicle transmission as claimed in claim 9, wherein said selectively interconnecting device further includes a fork, and wherein said sleeve has a groove sized to accept said fork and move axially by engagement of said fork in said groove.

17. The creeper gear arrangement as claimed in claim 1, wherein the sleeve is disposed radially outward and axially over of the creeper gear input shaft and the secondary output shaft.

18. The creeper gear arrangement as claimed in claim 1, wherein the secondary output shaft extends in an axial direction entirely through the creeper gear input shaft.

19. The vehicle transmission as claimed in claim 9, wherein the sleeve is disposed radially outward and axially over at least a portion of the creeper gear input shaft and at least a portion of the secondary output shaft.

20. The vehicle transmission as claimed in claim 9, wherein the secondary output shaft extends in an axial direction entirely through the creeper gear input shaft.

* * * * *